(12) United States Patent
Anno

(10) Patent No.: US 8,217,916 B2
(45) Date of Patent: Jul. 10, 2012

(54) DISPLAY DEVICE WITH TOUCH PANEL

(75) Inventor: Kouichi Anno, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 572 days.

(21) Appl. No.: 12/493,391

(22) Filed: Jun. 29, 2009

(65) Prior Publication Data

US 2009/0322704 A1 Dec. 31, 2009

(30) Foreign Application Priority Data

Jun. 30, 2008 (JP) ................................ 2008-169816

(51) Int. Cl.
*G06F 3/045* (2006.01)
(52) U.S. Cl. ........................................ 345/174; 345/173
(58) Field of Classification Search .......... 345/156–173; 178/18.01–18.04
See application file for complete search history.

(56) References Cited

U.S. PATENT DOCUMENTS

| | | | | |
|---|---|---|---|---|
| 7,982,723 | B2 * | 7/2011 | Ningrat | 345/174 |
| 8,111,243 | B2 * | 2/2012 | Peng et al. | 345/173 |
| 2007/0046648 | A1 * | 3/2007 | Lee et al. | 345/173 |
| 2008/0007534 | A1 * | 1/2008 | Peng et al. | 345/173 |
| 2008/0100592 | A1 * | 5/2008 | Shigeno et al. | 345/174 |
| 2008/0150906 | A1 * | 6/2008 | Grivna | 345/173 |
| 2009/0066669 | A1 * | 3/2009 | Olson | 345/174 |
| 2011/0043482 | A1 * | 2/2011 | Philipp | 345/174 |

FOREIGN PATENT DOCUMENTS

| | | |
|---|---|---|
| JP | 2003-511799 | 3/2003 |
| WO | WO 01/27868 A1 | 4/2001 |

* cited by examiner

*Primary Examiner* — Nitin Patel
(74) *Attorney, Agent, or Firm* — Antonelli, Terry, Stout & Kraus, LLP.

(57) ABSTRACT

The display device with a touch panel includes: a display panel; and a touch panel formed to be overlaid on the display panel, in which: the touch panel includes X electrodes and Y electrodes which intersect the X electrodes; the X electrodes and the Y electrodes include intersection portions at which the X electrodes and the Y electrodes intersect each other, and electrode portions each formed between the intersection portions; and either the electrode portions of the X electrode or the electrode portion of the Y electrodes are smaller in area than another thereof so that a capacitance of one line of the X electrodes and a capacitance of one line of the Y electrodes are equal to each other. The display device with a touch panel has a large S/N ratio and a high detection sensitivity.

15 Claims, 9 Drawing Sheets

000
DISPLAY DEVICE WITH TOUCH PANEL

CROSS-REFERENCE TO RELATED APPLICATION

The present application claims priority from Japanese application JP2008-169816 filed on Jun. 30, 2008, the content of which is hereby incorporated by reference into this application.

BACKGROUND OF THE INVENTION

1. Field of the Invention

The present invention relates to a display device with a touch panel, and more particularly, to a technology effectively applicable to a display device with a touch panel that is a capacitive touch panel.

2. Description of the Related Art

In recent years, a touch panel technology that supports human-conscious graphical user interfaces has played a pivotal role in prevalence of mobile equipment.

As the touch panel technology, a capacitive touch panel is known. As the capacitive touch panel, JP 2003-511799 A discloses a touch panel that detects a touch point touched by an observer's finger.

The touch panel described in JP 2003-511799 A detects the coordinates of a point touched by an observer through detection of a coupling capacitance between an electrode in an X direction and an electrode in a Y direction.

SUMMARY OF THE INVENTION

A common capacitive touch panel includes a plurality of X electrodes which extend in a first direction (for example, Y direction) and are placed next to one another in a second direction (for example, X direction) intersecting the first direction, and a plurality of Y electrodes which extend in the second direction to intersect the X electrodes and are placed next to one another in the first direction. Touch panels of this type are called X-Y touch panels.

The plurality of X electrodes and the plurality of Y electrodes in an X-Y touch panel are formed on a substrate with an interlayer insulating film interposed between the X electrode layer and the Y electrode layer. Those X electrodes and Y electrodes are formed of a transparent conductive material such as indium tin oxide (ITO).

In X-Y touch panels of the related art, the capacitance of one line of electrodes in a steady state where the touch panel is not being touched by a finger or the like includes an inter-electrode capacitance with an adjacent electrode, an intersection capacitance formed at the intersection of orthogonal electrodes, and a ground capacitance with a display device placed under the touch panel.

An index of their detection sensitivity, which is the ratio of a change in capacitance that is caused by a touch of a finger or the like to background noise (hereinafter referred to as S/N ratio), is used. Raising the detection sensitivity, i.e., the S/N ratio, requires increasing signals or reducing noise.

The signal level is in proportion to the capacitance that is formed between a finger or the like touching the touch panel and an electrode. A fact found about background noise is that the fluctuations in voltage of a signal generated by the display device in order to display an image are detected as noise by electrodes of the touch panel which is located right above the display device. It is easier to detect the noise when the total electrode area along one line of electrodes is larger because the ground capacitance is accordingly larger.

The touch panel overlaid on the display device when in use has substantially the same contour as that of the display device. The display device generally has a rectangular shape which is longer in the X direction or in the Y direction.

In the related art, individual electrodes constituting one line in the X direction and individual electrodes constituting one line in the Y direction are equal in size whereas one line of electrodes in the X direction and one line of electrodes in the Y direction differ from each other in length and in the number of individual electrodes constituting one line. The capacitance of one line of electrodes in the X direction therefore differs from the capacitance of one line of electrodes in the Y direction. To give an example, in the case of a touch panel vertically long, the capacitance of one line of X electrodes which are arranged parallel to one another in the Y direction is larger than the capacitance of one line of Y electrodes which are arranged parallel to one another in the X direction.

The difference in capacitance along one line of electrodes between the X direction and the Y direction means that the noise intensity differs between the X direction and the Y direction in touch panels of the related art. In other words, the S/N ratio differs between the X direction and the Y direction in touch panels of the related art.

Therefore the overall detection sensitivity of the touch panel is defined by the lower one of the differing S/N ratios.

The present invention has been made in view of described above, and an object of the present invention is therefore to provide a display device with a touch panel that has a large S/N ratio and a high detection sensitivity.

The above-mentioned and other objects of the present invention, as well as novel features of the present invention, become clear through a description given herein and the accompanying drawings.

The inventors of the present invention have found out that, in touch panels of the related art, the noise intensity ratio of the X electrodes to the Y electrodes is substantially equal to the X electrode-to-Y electrode capacitance ratio, namely, X electrode-to-Y electrode count ratio.

The present invention is based on the above-mentioned findings. The above-mentioned object is attained by: reducing the area of each individual electrode on a line of electrodes that runs along the longer sides of an input region of a touch panel; setting the ratio of the area of each individual electrode on this line of electrodes to the area of each individual electrode on another line of electrodes, which is orthogonal to the former line of electrodes, to a value smaller than the ratio of the electrode count of the line of electrodes that runs along the input region's longer side direction to the electrode count of the line of electrodes that runs along the input region's shorter side direction by 10% or less so that the capacitance along one line of electrodes is substantially equal to the capacitance along the other line of electrodes; and disposing floating electrodes (dummy electrodes) in places freed up by the area reduction.

Of aspects of the present invention disclosed herein, representative ones are briefly described as follows:

(1) A display device with a touch panel, which includes: a display panel; and a capacitive touch panel formed to be overlaid on the display panel, and is characterized in that: the touch panel includes X electrodes and Y electrodes which intersect the X electrodes; the X electrodes and the Y electrodes include intersection portions at which the X electrodes and the Y electrodes overlap each other, and electrode portions each formed between two of the intersection portions; and one of the electrode portions of the X electrode and the electrode portions of the Y electrode is smaller in area than another thereof so that a capacitance of one line of the X electrodes and a capacitance of one line of the Y electrodes are equal to each other.

(2) A display device with a touch panel, which includes: a display panel; and a capacitive touch panel bonded onto the display panel, and is characterized in that:: the touch panel includes X electrodes and Y electrodes which intersect the X electrodes; the display panel has longer sides and shorter sides; the X electrodes and the Y electrodes include intersection portions at which the X electrodes and the Y electrodes overlap each other, and individual electrodes each formed between two of the intersection portions and being wider than the intersection portions; the X electrodes are formed along the longer sides whereas the Y electrodes are formed along the shorter sides; and each individual electrode of the X electrodes is smaller in area than each individual electrode of the Y electrodes.

(3) A display device with a touch panel, which includes: a display panel; and a capacitive touch panel placed on the display panel, and is characterized in that: the touch panel includes X electrodes and Y electrodes which intersect the X electrodes; the X electrodes and the Y electrodes include intersection portions at which the X electrodes and the Y electrodes overlap each other, and individual electrodes each formed between two of the intersection portions and being wider than the intersection portions; the a number of the individual electrodes of the X electrodes is n and a number of the individual electrodes of the Y electrodes is m; and a ratio between an area of the individual electrodes of the X electrodes and an area of the individual electrodes of the Y electrodes is m:n.

The advantageous effect that are obtained by the representative ones of the aspects of the present invention disclosed herein are summarized as follows.

According to the present invention, there can be provided a display device with a touch panel that has a large S/N ratio and a high detection sensitivity.

DETAILED DESCRIPTION OF THE INVENTION

An embodiment of the present invention is described below in detail with reference to the drawings.

Throughout the drawings for describing the embodiment of the present invention, components that have the same function are denoted by the same reference symbol in order to avoid repetitive description.

The description of this embodiment takes a liquid crystal display panel as an example of a display panel. Any display panel can be employed as long as it allows the use of a touch panel and, other than liquid crystal display panels, display panels that use organic light emitting diode elements or surface conduction electron emitter elements are employable.

Figure 1:
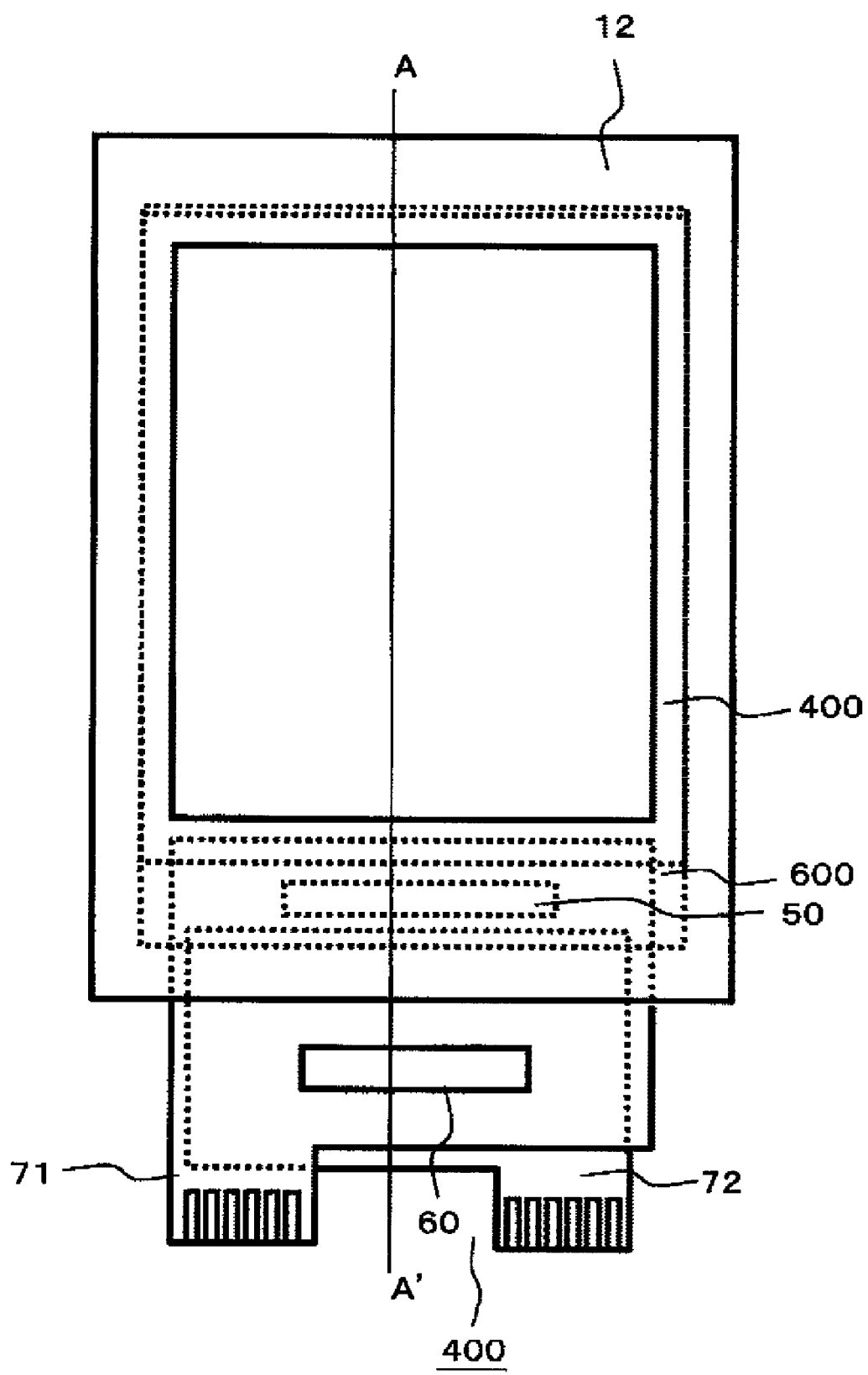
FIG. 1 is a plan view illustrating a schematic structure of a display device with a touch panel according to an embodiment of the present invention.
Figure 2:
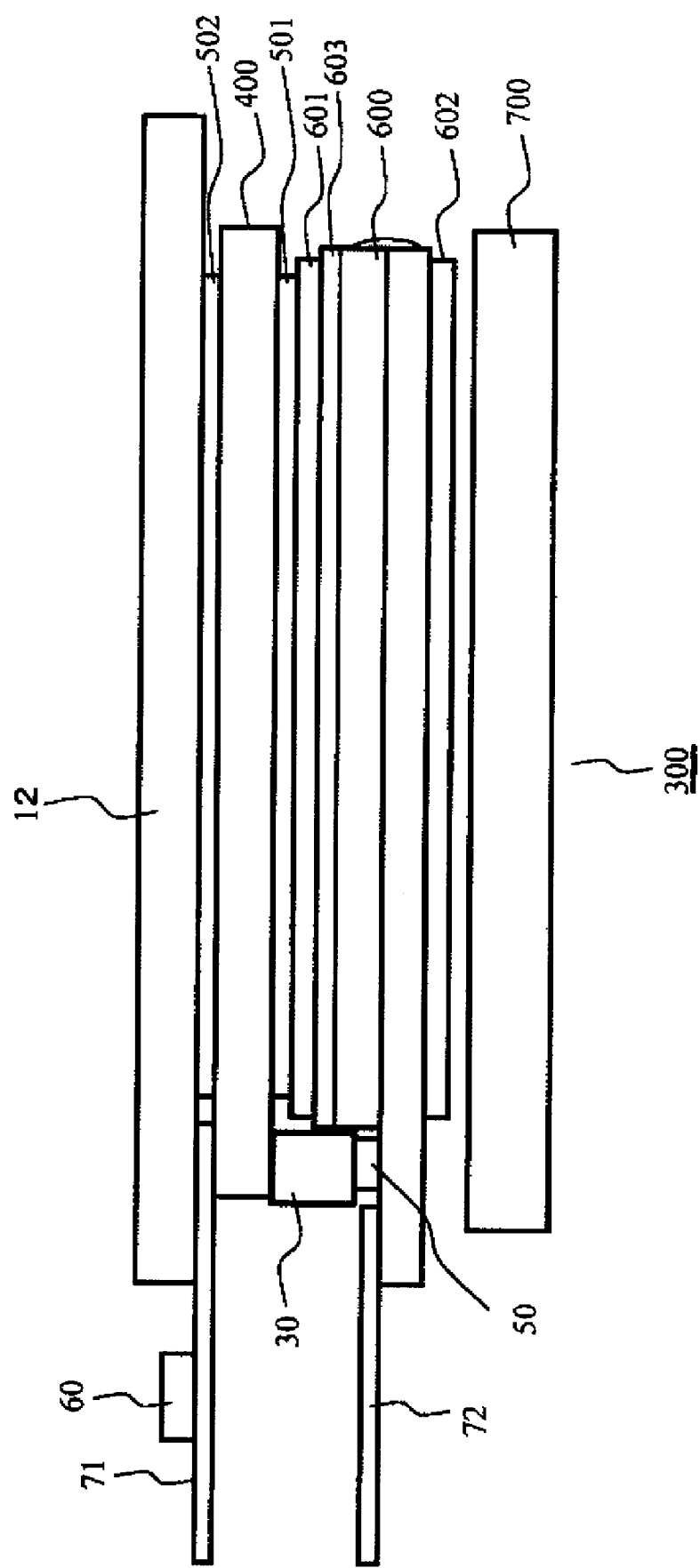
FIG. 2 is a sectional view illustrating a sectional structure taken along the line A-A' of FIG. 1.

FIG. 1 is a plan view illustrating a schematic structure of a display device with a touch panel according to the embodiment of the present invention. FIG. 2 is a sectional view taken along the line A-A' of FIG. 1.

A display device with a touch panel 300 of this embodiment includes, as illustrated in FIGS. 1 and 2, a liquid crystal display panel 600, a capacitive touch panel 400 which is placed on an observer side of the liquid crystal display panel 600, and a backlight 700 which is placed on the opposite side of the liquid crystal display panel 600 from the observer side. The liquid crystal display panel 600 can be, for example, an in plane switching (IPS) liquid crystal display panel, a twisted nematic (TN) liquid crystal display panel, or a vertical alignment (VA) liquid crystal display panel.

The liquid crystal display panel 600 is formed by bonding together two substrates that are opposed to each other. Polarizing plates 601 and 602 are provided on the exteriors of the two substrates.

The liquid crystal display panel 600 and the touch panel 400 are bonded to each other with a first bonding member 501 which is a resin film, an adhesive film, or the like. A second bonding member 502 which is a resin film, an adhesive film, or the like bonds a front surface protecting plate (also called front window) 12 made of an acrylic resin to the exterior of the touch panel 400.

A transparent conductive layer 603 is provided between the liquid crystal display panel 600 and the polarizing plate 601. The transparent conductive layer 603 is formed to shield against signals generated by the liquid crystal display panel 600. A large number of electrodes are provided on the liquid crystal display panel 600 and voltages are applied as signals to the electrodes on various timings.

A change in voltage on the liquid crystal display panel 600 is noise to electrodes that are provided on the capacitive touch panel 400. The liquid crystal display panel 600 therefore needs to be electrically shielded, and this is why the transparent conductive layer 603 is provided. In order to function as a shield, the transparent conductive layer 603 receives a supply of a constant voltage from a flexible printed board 71 or others, and is set to, for example, a ground potential.

The transparent conductive layer 603 desirably has a sheet resistance value approximately equal to that of the electrodes provided on the touch panel 400, specifically, 150 to 200 Ω/square, for reducing the influence of the noise. The resistance value of the transparent conductive layer 603 is known to have a relation with the crystal grain size. The transparent conductive layer 603 can have a sheet resistance value of 150 to 200 Ω/square by setting the heat treatment temperature to 200° C. or higher for crystallizing.

The transparent conductive layer 603 may have an even lower resistance. For example, setting the heat treatment temperature to 450° C. and thereby crystallizing the transparent conductive layer 603 thoroughly gives the transparent conductive layer 603 a sheet resistance value of 10 to 40 Ω/square. The effect of reducing the noise is improved when the shielding transparent conductive layer 603 has a resistance approximately equal to, or lower than that of the electrodes provided on the touch panel 400. In the case of an IPS liquid crystal display panel where a reverse-surface side transparent conductive film is formed between the liquid crystal display panel 600 and the polarizing plate 601, the reverse-surface side transparent conductive film may also have a function as the transparent conductive layer 603.

A drive circuit 50 is provided across from one of the four sides of the liquid crystal display panel 600, and supplies various signals to image elements inside the liquid crystal display panel 600. A flexible printed board 72 is connected to one of the four sides of the liquid crystal display panel 600 in order to supply signals from the outside. The signals are supplied from the outside to the drive circuit 50 via the flexible printed board 72.

Another flexible printed board 71 is connected to the touch panel 400. A touch panel control circuit 60 is mounted to the flexible printed board 71 to control the detection of an input point and other operations.

A spacer 30 is placed between the touch panel 400 and the drive circuit 50.

Figure 3:
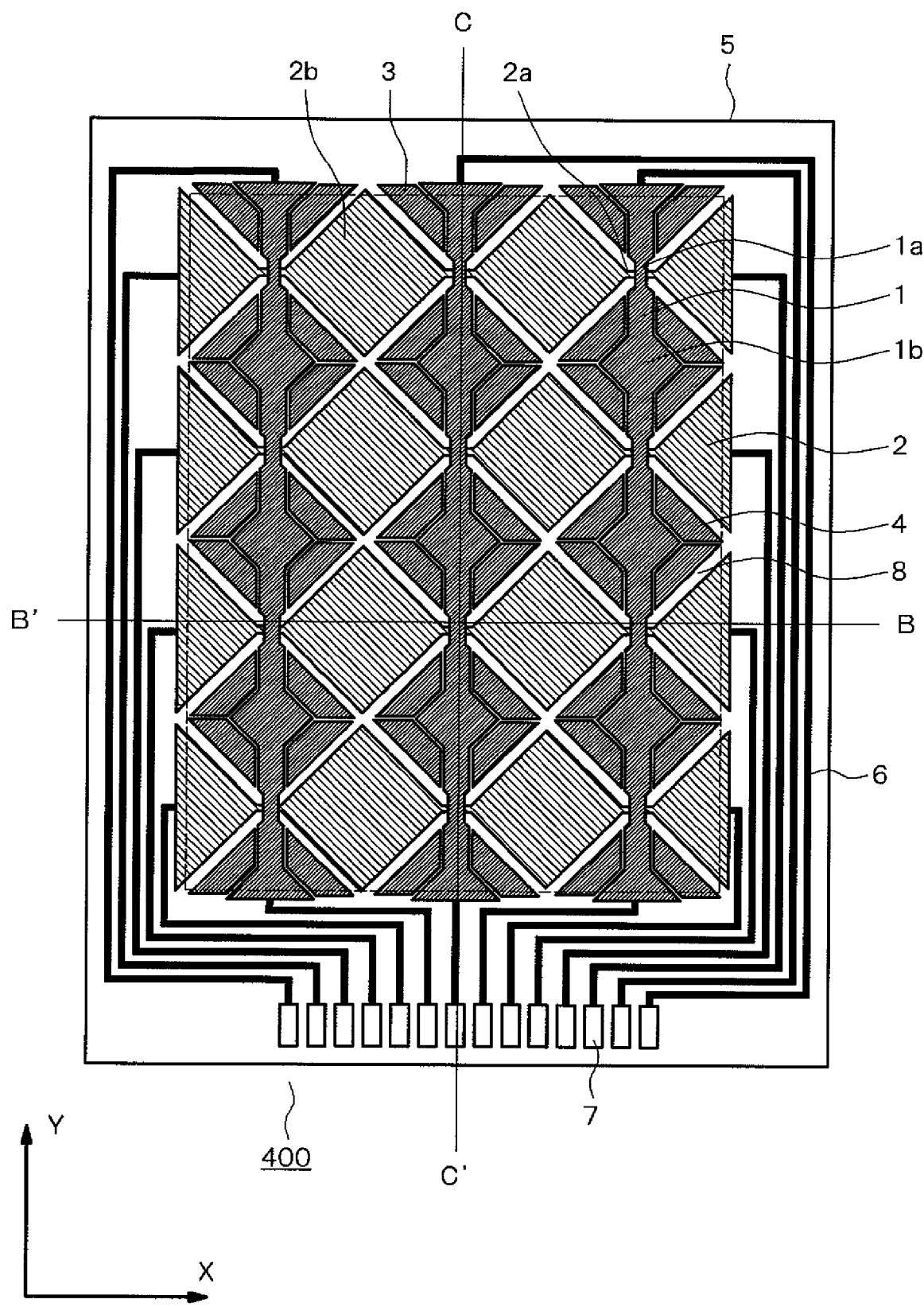
FIG. 3 is a plan view illustrating an electrode pattern of a capacitive touch panel according to the embodiment of the present invention.

FIG. 3 is a plan view illustrating the electrode structure of the touch panel 400 according to this embodiment. FIG. 3 illustrates a case of using the touch panel 400 vertically long. The liquid crystal display panel 600 overlaid with the touch panel 400 similarly has a shape vertically long as mentioned above.

A glass substrate 5 is employed as a transparent substrate. Touch panel electrodes (1 and 2), connection terminals 7, wiring lines 6 extending from the touch panel electrodes (1 and 2) to the connection terminals 7 are placed on one surface of the glass substrate 5. At least intersection portions of the two touch panel electrodes (1 and 2) arranged orthogonally to each other are separated by an insulating film.

The touch panel electrodes (1 and 2) are formed of a transparent conductive film. Of the touch electrodes (1 and 2), electrodes that extend in the longitudinal direction (Y direction of FIG. 3) and are arranged side by side in the lateral direction (X direction) are called X electrodes 1, whereas electrodes that extend in the lateral direction (X direction) to intersect the X electrodes 1 and are arranged side by side in the longitudinal direction (Y direction) are called Y electrodes 2. The touch panel 400 of this embodiment detects a change in capacitance of those X electrodes 1 and Y electrodes 2 to calculate a point where the touch panel 400 has been touched. A region inside the dotted line, which is denoted by reference numeral 3 and capable of detection, is called an input region.

The X electrodes 1 and the Y electrodes 2 are narrower in intersection portions 1a and intersection portions 2a, respectively, and wider in electrode portions 1b and electrode portions 2b, respectively. Each electrode portion 1b is sandwiched between two intersection portions 1a and each electrode portion 2b is sandwiched between two intersection portions 2a. The electrode portion 1b sandwiched between the intersection portions 1a and the electrode portion 2b sandwiched between the electrode portions 2a are also called individual electrodes.

In the touch panel 400 of this embodiment, the individual electrodes 1b of the X electrodes 1 are narrower than the individual electrodes 2b of the Y electrodes 2 as illustrated in FIG. 3. In other words, the area of the X electrodes 1 is made smaller in a manner that reflects the ratio of the count of the individual electrodes 1b of the X electrodes 1 to the count of the individual electrodes 2b of the Y electrodes 2, and the X electrodes 1 are divided into the individual electrodes 1b and electrodes (dummy electrodes) 4 which have a floating potential.

In this way, the electrode area of the X electrodes 1 which would be larger as the vertical length of the panel's shape is longer is reduced such that the capacitance along one line of X electrodes 1 is substantially equal to the capacitance along one line of Y electrodes 2. The X electrodes 1 and the Y electrodes 2 are thus made equal in terms of noise that is caused by fluctuations in voltage of a signal generated by the liquid crystal display panel 600.

As mentioned above, the transparent conductive layer 603 provided on the liquid crystal display panel 600 reduces the influence of the noise from the liquid crystal display panel 600. However, forming the transparent conductive layer 603 on the liquid crystal display panel 600 at high temperature is difficult and, in some cases, it is not possible to form the transparent conductive layer 603 that has sufficiently low resistance on the liquid crystal display panel 600. Further, even with the transparent conductive layer 603, the noise from the liquid crystal display panel 600 can still influence.

Figure 4:
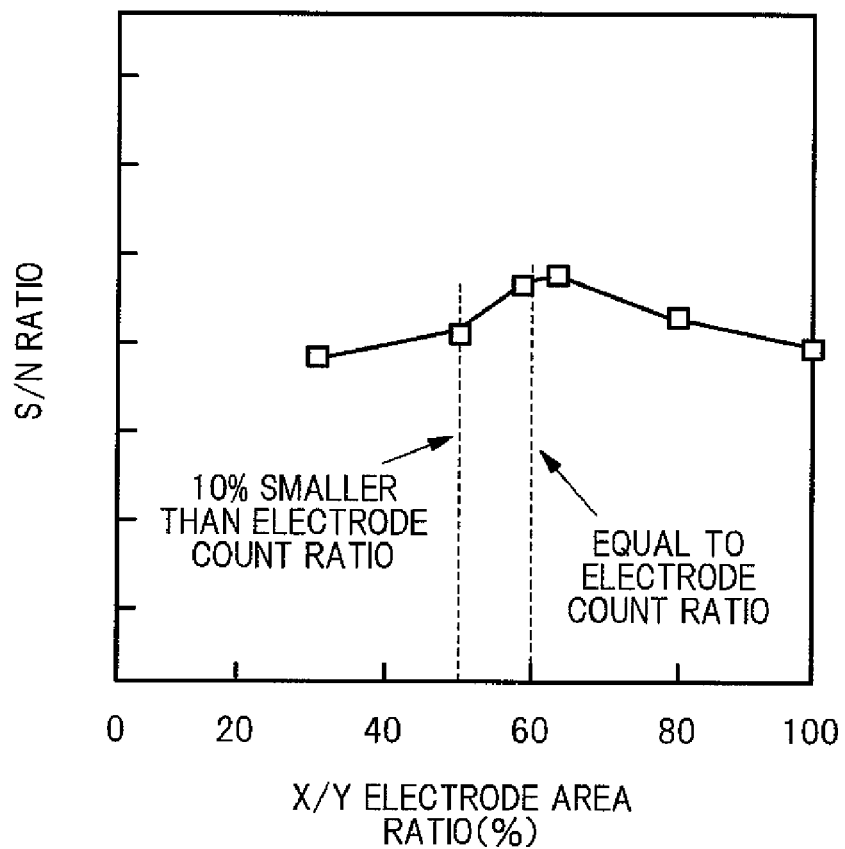
FIG. 4 is a graph illustrating a change in S/N ratio of a capacitive touch panel when an area of each individual electrode of X electrodes, which is arranged parallel to each other in a longitudinal direction, is varied.

FIG. 4 is a graph illustrating results of an S/N ratio evaluation on the trial touch panel 400 by varying the area of each individual electrode 1b along an X electrode line parallel to the longitudinal direction. The trial touch panel 400 has six X electrodes 1, ten Y electrodes 2, an X-to-Y electrode count ratio of 60%, and a shape vertically long. In FIG. 4, the axis of abscissa indicates the area ratio of each individual electrode 1b to each individual electrode 2b, and the axis of ordinate indicates the S/N ratio.

As illustrated in FIG. 4, when the area of the individual electrode 1b becomes smaller and the floating electrodes are formed, the ground capacitance decreases and the noise level can be reduced. When one of the X electrodes 1 reduced in area is touched with a finger or the like, the floating electrodes 4 adjacent to the touched X electrode 1 are also touched and caused to function by capacitance coupling. The degree of the signal level reduction is therefore smaller than the degree of the area reduction.

The resultant S/N ratio therefore has peaked at an area ratio that is equal to the electrode count ratio as illustrated in FIG. 4.

In the case where the floating electrodes 4 are not provided, an interval 8 between one X electrode 1 and its adjacent Y electrode 2 is larger than when the floating electrodes 4 are provided. The interval 8 is a region that includes the insulating film and the glass substrate but does not include the transparent conductive film of which the X electrodes 1 and the Y electrodes 2 are formed as mentioned above. A portion that includes the transparent conductive film and a portion that does not include the transparent conductive film differ from each other in terms of transmittance, reflectance, and chromaticity of reflected light, and hence the interval 8 is visible to the naked eye, which lowers the quality of the displayed image.

According to our study, the interval 8 has been faintly visible when it is 30 μm wide, hardly visible at 20 μm, and invisible at 10 μm. Narrowing the interval 8 increases the capacitance between the X electrode 1 and the Y electrode 2 that are adjacent to each other with the floating electrode 4 interposed therebetween. Narrowing the interval 8 also increases defects in which unsuccessful pattern formation due to a foreign object attached in the process of manufacture results in a short-circuit between the X electrode 1 or the Y electrode 2 and the floating electrode 4.

A short-circuit of the floating electrode 4 adjacent to the individual electrode 1b of one X electrode 1 causes inconveniences such as an increase in ground capacitance of the relevant one line of X electrodes, increased noise, and a decrease in detection sensitivity.

In order to reduce an increase in capacitance that is caused by the short-circuit, each floating electrode 4 is a ¼ piece of a whole as illustrated in FIG. 3. Dividing each floating electrode 4 into more pieces lowers the risk of a short-circuit defect, but increases the regions that do not have the transparent conductive film, which may increase the difference in transmittance, reflectance, and chromaticity between adjacent electrodes. This embodiment therefore chooses to divide each floating electrode 4 into four and set the interval between the electrodes narrower than 30 μm, specifically, to 20 μm or so.

This embodiment shows a case of overlaying a touch panel on a liquid crystal display device vertically long, but the effects of the present invention are similarly obtained when the touch panel is overlaid on a liquid crystal display device vertically long, or on other types of image display device. Further, the number of pieces into which each floating electrode is divided is not limited to four.

A method of manufacturing the touch panel 400 according to the embodiment of the present invention is described next with reference to FIGS. 5 to 13. FIGS. 5 to 8 illustrate sectional structures taken along the line B-B' of FIG. 3 at various process stages. Similarly, FIGS. 9 to 12 illustrate sectional structures taken along the line C-C' of FIG. 3 at various process stages.

A first step is described with reference to FIGS. 5 and 9.

In the first step, a first indium tin oxide (ITO) film 14 is formed on the glass substrate 5 to have a thickness of about 15 nm, and then a silver alloy film 15 is formed to have a thickness of about 200 nm.

Next, a resist pattern is formed by photolithography process to pattern the silver alloy film 15.

The resist is removed and another resist pattern is formed by photolithography process to pattern the first ITO film 14.

Figure 5:
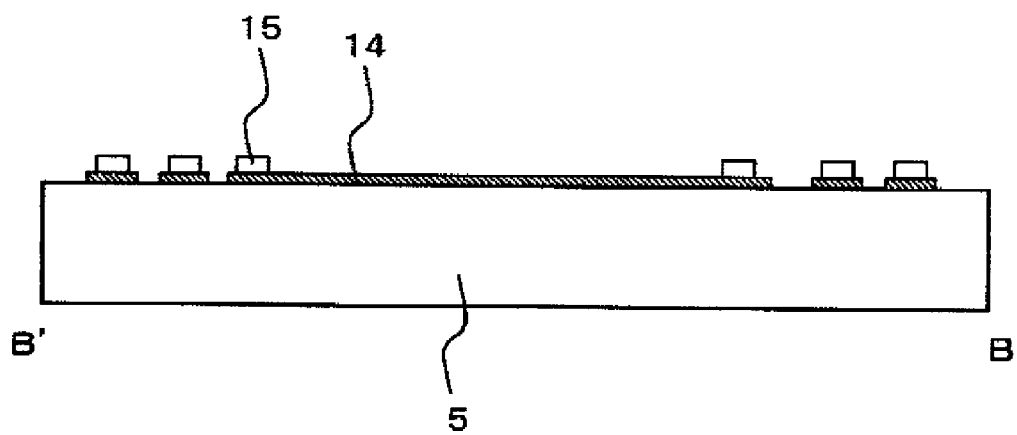
FIG. 5 is a sectional view illustrating a sectional structure of the line B-B' at the first step of the method of manufacturing the touch panel according to the embodiment of the present invention.
Figure 9:
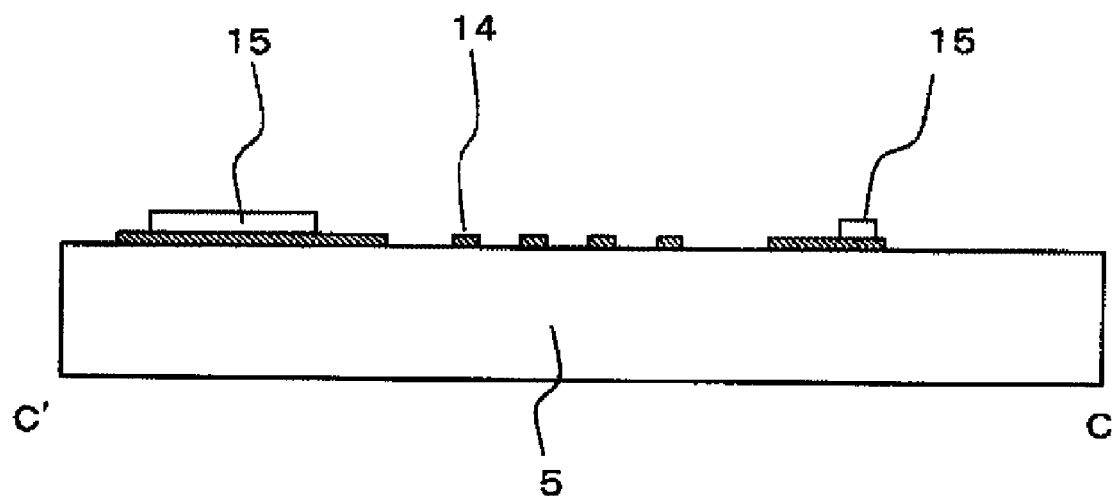
FIG. 9 is a sectional view illustrating a sectional structure of the line C-C' at the first step of the method of manufacturing the touch panel according to the embodiment of the present invention.

Thereafter, the resist is removed and the patterned ITO film 14 (Y electrodes 2) and silver alloy film 15 (wiring lines 6) are formed as illustrated in FIGS. 5 and 9.

The silver alloy film 15 which is opaque has to be prevented from being visible. Then, the silver alloy film 15 is formed as only the peripheral wiring lines 6 by removing a part of the silver alloy film 15 that overlaps with the display region of the liquid crystal display panel 600, which is overlaid later.

Figure 6:
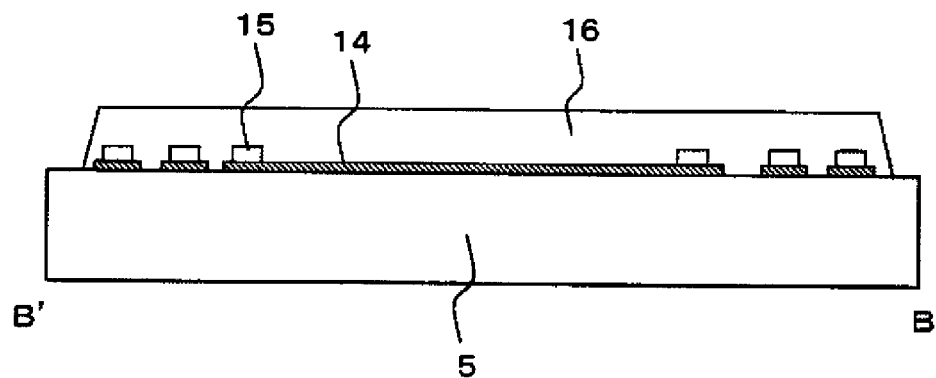
FIG. 6 is a sectional view illustrating the sectional structure of the line B-B' at the second step of the method of manufacturing the touch panel according to the embodiment of the present invention.

A second step is described next with reference to FIGS. 6 and 10.

In the second step, a photosensitive interlayer insulating film 16 is formed by application on the substrate on which the first ITO film 14 and the silver alloy film 15 have been patterned. The interlayer insulating film 16 is patterned through photolithography process. The interlayer insulating film 16 is desirably a film formed by application of a material that contains $SiO_2$ as the main component to have a thickness of 1 μm or more.

Figure 10:
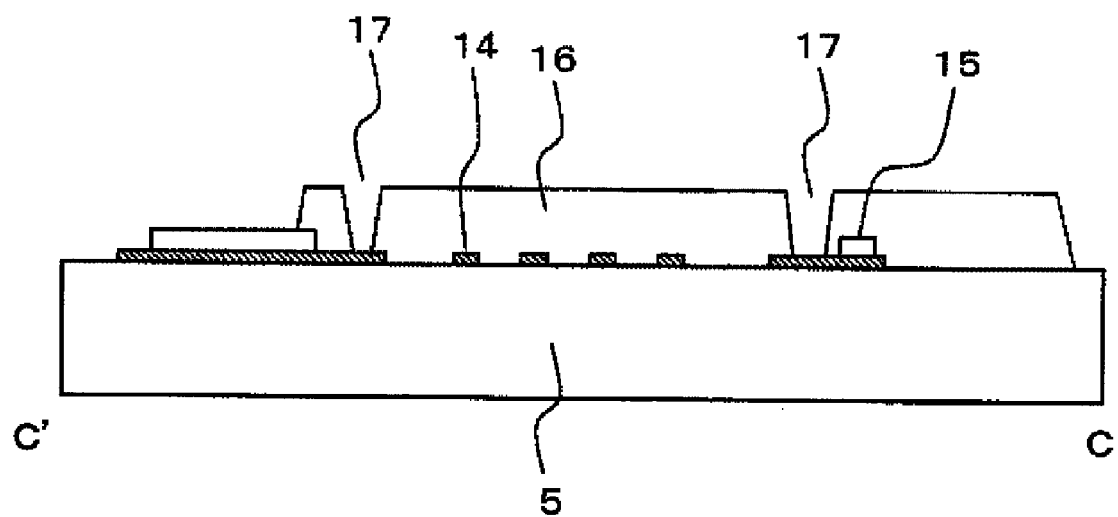
FIG. 10 is a sectional view illustrating the sectional structure of the line C-C' at the second step of the method of manufacturing the touch panel according to the embodiment of the present invention.

As illustrated in FIG. 10, the contact holes 17 are formed in the peripheral portion. The interlayer insulating film pattern 16 is removed from a terminal connection portion which is used for a connection with an external drive circuit.

A third step is described next with reference to FIGS. 7 and 11.

In the third step, a second ITO film 18 is formed to have a thickness of about 30 nm and a resist pattern is formed by photolithography process to pattern the second ITO film 18.

Figure 7:
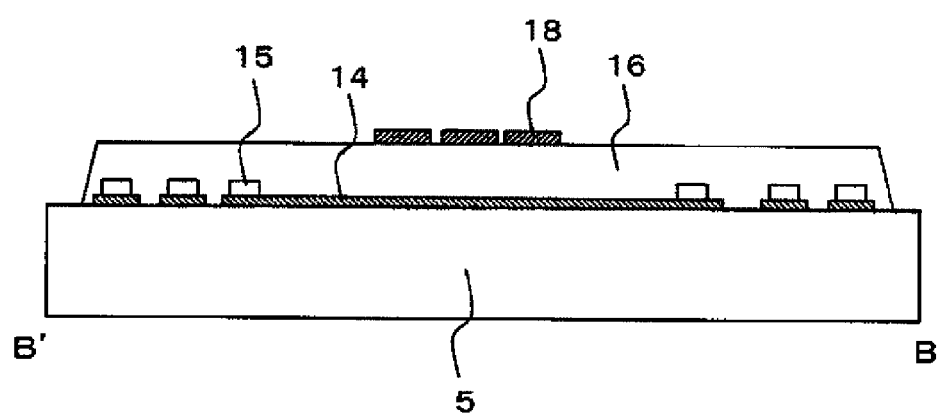
FIG. 7 is a sectional view illustrating the sectional structure of the line B-B' at the third step of the method of manufacturing the touch panel according to the embodiment of the present invention.
Figure 11:
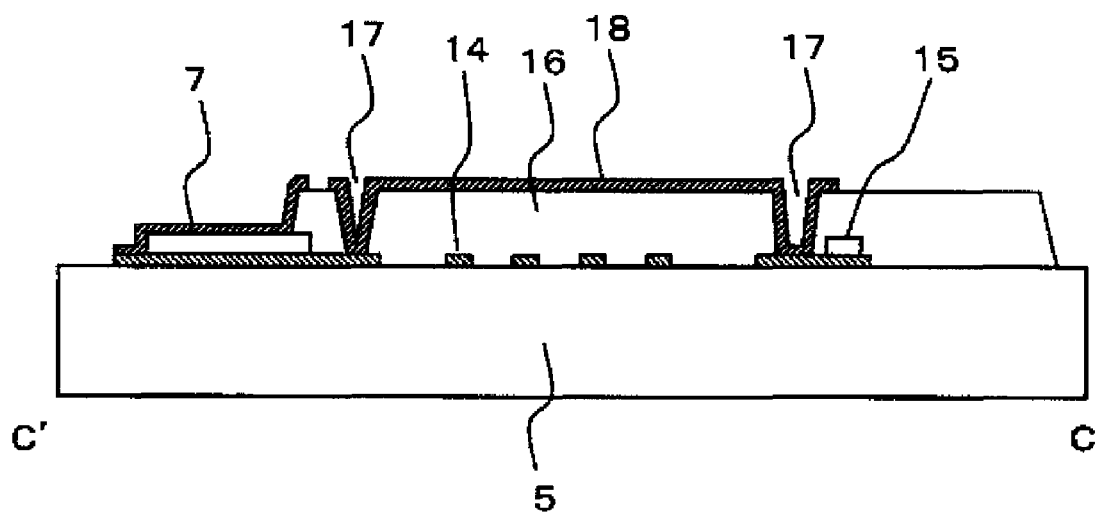
FIG. 11 is a sectional view illustrating the sectional structure of the line C-C' at the third step of the method of manufacturing the touch panel according to the embodiment of the present invention.

The resist is then removed and the second ITO film 18 (X electrodes 1) is formed as illustrated in FIGS. 7 and 11.

Figure 8:
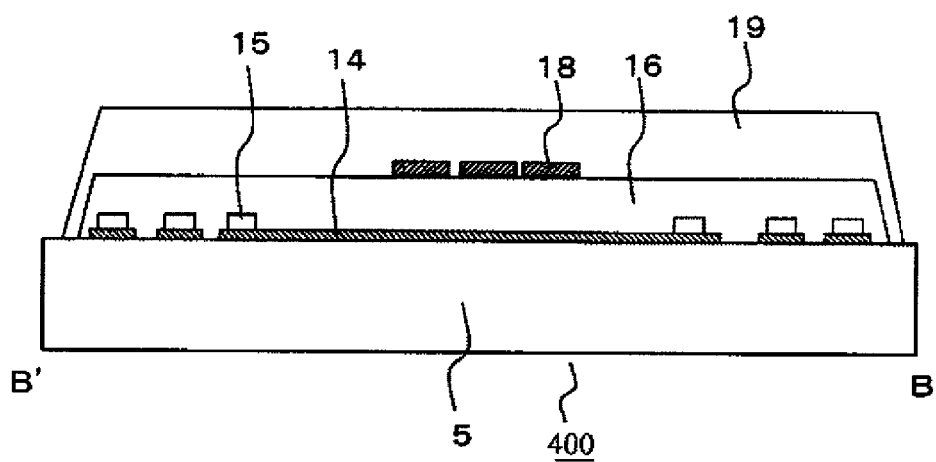
FIG. 8 is a sectional view illustrating the sectional structure of the line B-B' at the fourth step of the method of manufacturing the touch panel according to the embodiment of the present invention.
Figure 12:
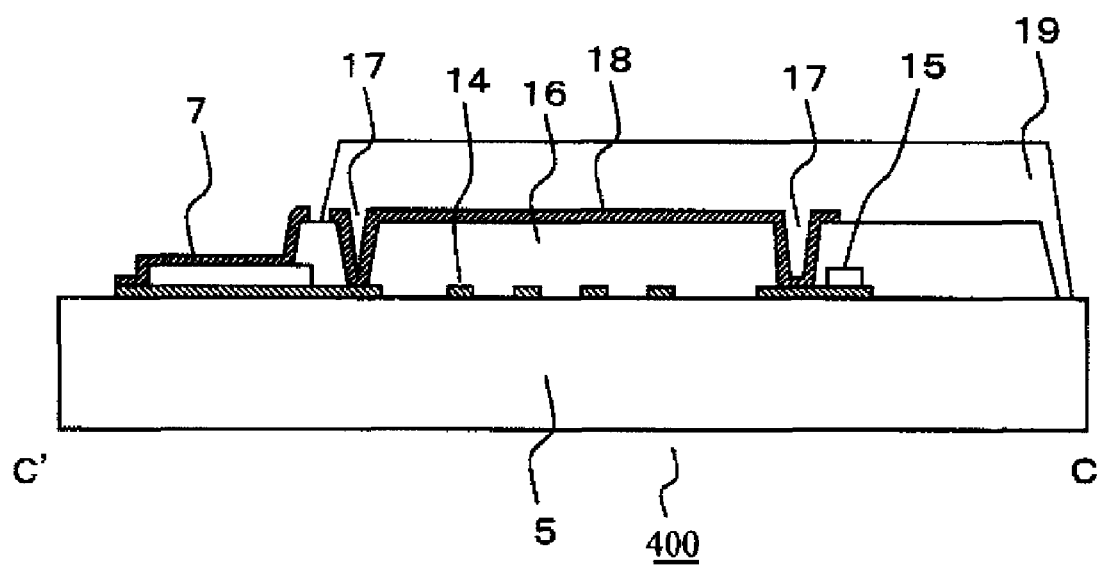
FIG. 12 is a sectional view illustrating the sectional structure of the line C-C' at the fourth step of the method of manufacturing the touch panel according to the embodiment of the present invention.

A fourth step is described next with reference to FIGS. 8 and 12.

In the fourth step, the same kind of film as the insulating film used in the second step is formed on the substrate by application as an uppermost protective film 19. The uppermost protective film 19 is patterned by photolithography process.

The touch panel 400 is formed through the above-mentioned steps.

A brief description is given below on the operation of detecting an input point of the touch panel 400 according to this embodiment.

In this embodiment, the touch panel control circuit 60 supplies a constant current to the X electrodes 1 and the Y electrodes 2 sequentially to charge the X electrodes 1 or the Y electrodes 2, and a period T required for the voltage of the X electrodes 1 or the Y electrodes 2 to rise to a given reference voltage (Vref) is measured.

Figure 13:
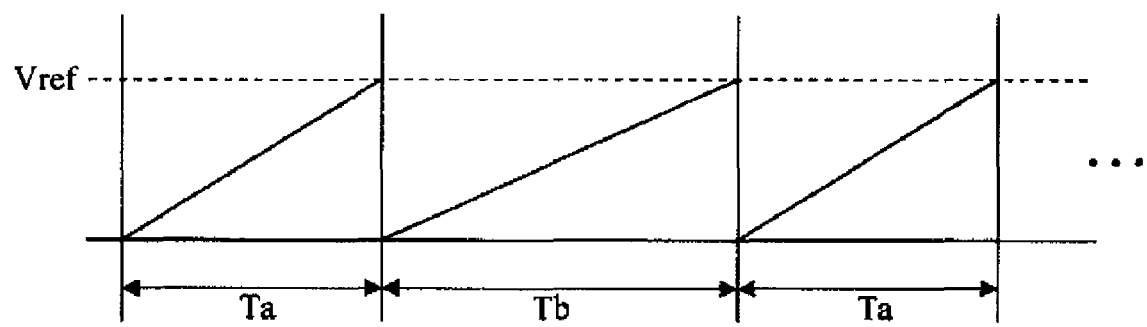
FIG. 13 is a diagram illustrating a state in which an observer's finger is touching the touch panel according to the embodiment of the present invention.
Figure 14:
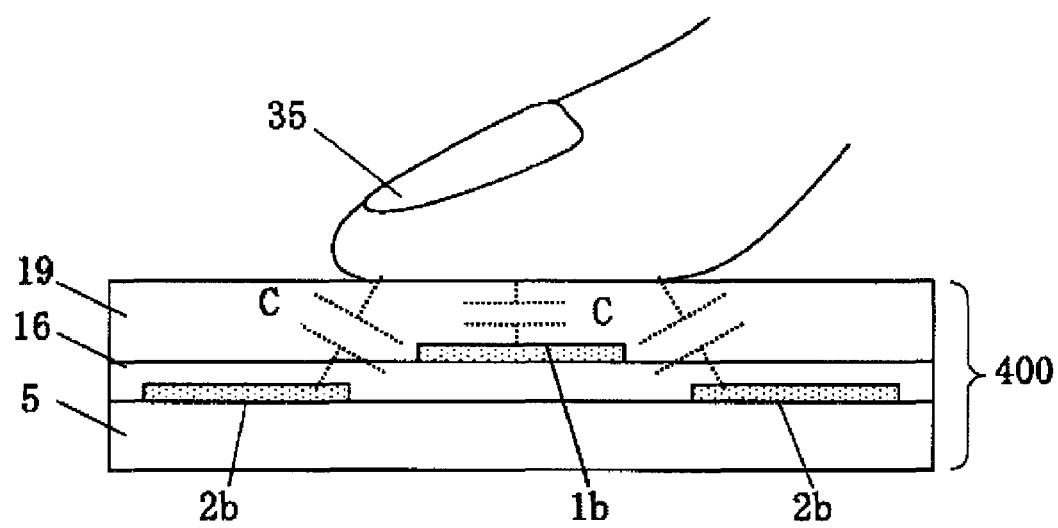
FIG. 14 is a diagram illustrating an operation of detecting an input point of the touch panel according to the embodiment of the present invention.

For example, in a state where the touch panel 400 is not being touched by an observer's finger or the like, the period T is Ta as illustrated in FIG. 13. In a state where an observer's finger 35 or the like is touching the touch panel 400 as illustrated in FIG. 14, a capacitor (C) is added to the individual electrodes (1b or 2b) of the X electrodes 1 or the Y electrodes 2, thereby setting the period T to Tb, which is longer than Ta (Ta<Tb).

The observer's finger 35 is generally larger than the area of the individual electrode (1b or 2b) of one X electrode 1 or one Y electrode 2. Accordingly, the period T that is longer than Ta (for example, the period Tb) is detected in a plurality of X electrodes 1 or a plurality of Y electrodes 2. Based on the locations of a plurality of electrodes at which the period T that is longer than Ta is detected and the length of the period (for example, Tb) detected in those electrodes, the centroid point is obtained by centroid processing as an input point.

The above-mentioned period T is detected from the count of basic clocks (e.g., dot clocks (CLKs) used in the liquid crystal display panel 600).

Therefore, "the capacitance of one line of the X electrodes and the capacitance of one line of the Y electrodes" mentioned in the aspect (1) of the present invention also means a capacitance component of impedance viewed from the touch panel control circuit 60. "The capacitance of one line of the X electrodes and the capacitance of one line of the Y electrodes are equal to each other" also means that the above-mentioned period T, or the count of dot clocks (CLKs) within the period T, is equal between the X electrodes and the Y electrodes.

Further, "the capacitance of one line of the X electrodes and the capacitance of one line of the Y electrodes are equal to each other" means that the capacitance of one line of electrodes is within ±10% of a designed value. Then, "the count of dot clocks (CLKs) within the period T is equal between the X electrodes and the Y electrodes" naturally means that the dot clock count is within ±10% of a designed value.

The present invention can be applied irrespective of the shape of the input detection region and the shape of the individual electrodes. For example, the present invention is applicable to a touch panel in which the X electrodes 1 and the Y electrodes 2 are formed in the same layer as illustrated in FIGS. 15 and 16.

Figure 15:
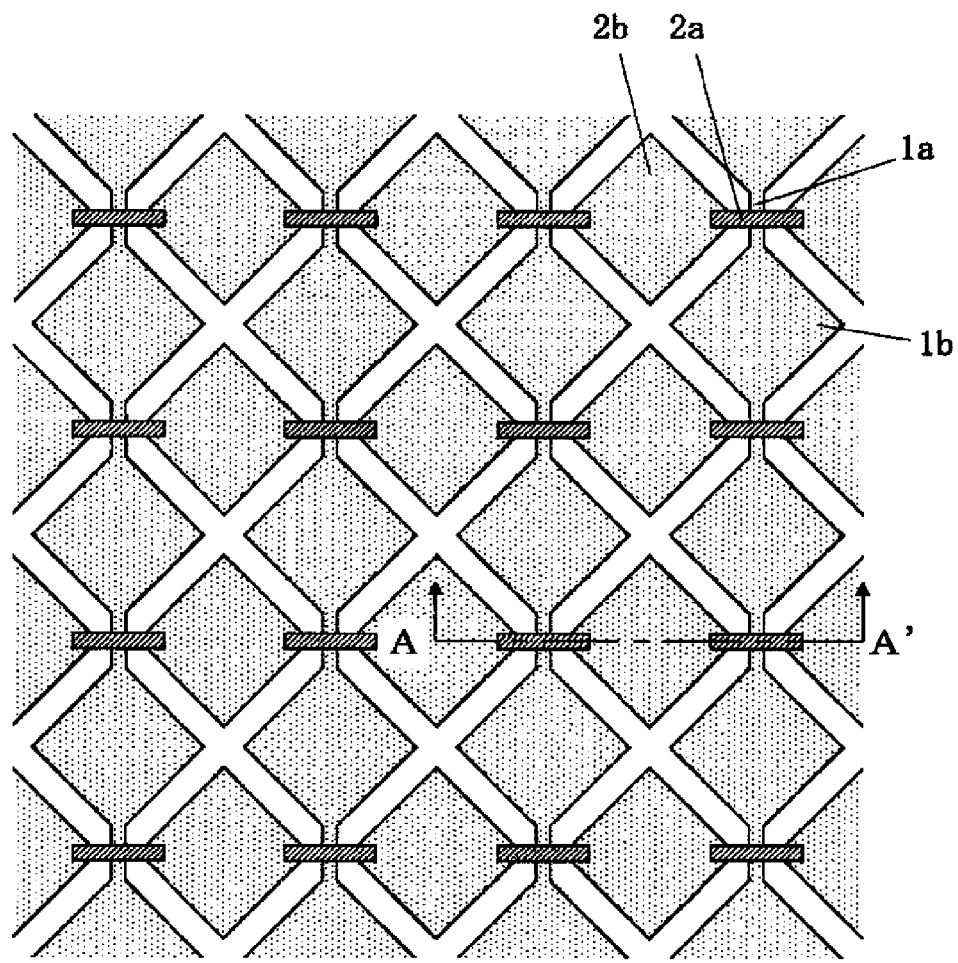
FIG. 15 is a plan view illustrating an electrode pattern of another touch panel to which the present invention is applied.
Figure 16:
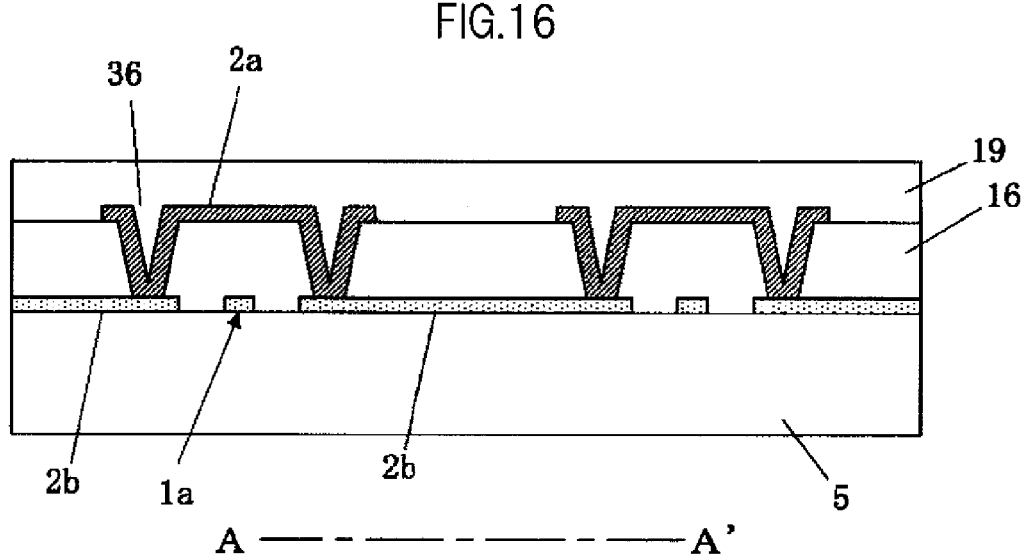
FIG. 16 is a sectional view illustrating a sectional structure taken along the line A-A' of FIG. 15.

In the touch panel illustrated in FIGS. 15 and 16, the individual electrodes 1b of the X electrodes 1 and the individual electrodes 2b of the Y electrodes 2 are formed in the same conductive layer but are separated from each other, whereas the intersection portions 1a of the X electrodes 1 and the intersection portions 2a of the Y electrodes 2 are formed in different conductive layers.

In FIG. 16, the intersection portions 2a of the Y electrodes 2 are formed in a layer above the intersection portions 1a of the X electrodes 1 and intersect the intersection portions 1a of the X electrodes 1a. The intersection portions 2a of the Y electrodes 2 are connected to the individual electrodes 2b of the Y electrodes 2 through contact holes 36 formed in the interlayer insulating film 16. FIG. 16 is a sectional view illustrating a sectional structure taken along the line A-A' of FIG. 15.

The embodiment above describes X direction electrodes and Y direction electrodes which are orthogonal to each other. However, the present invention is aimed at averaging the difference in capacitance between electrode lines used in the detection of an input point, and is therefore effective also for an adjustment of the capacitance between electrodes that intersect each other obliquely, or between side-by-side electrode lines that have different lengths.

According to the present invention, a touch panel having an excellent detection sensitivity can thus be manufactured as a capacitive input device for an image information/text information display device.

While there have been described what are at present considered to be certain embodiments of the invention, it is understood that various modifications may be made thereto, and it is intended that the appended claim cover all such modifications as fall within the true spirit and scope of the invention.

What is claimed is:

1. A display device with a touch panel, comprising:
a display panel; and
a touch panel formed to be overlaid on the display panel, wherein the touch panel includes:
X electrodes which extend in the same direction; and
Y electrodes which extend in a direction different from the direction of the X electrodes,
wherein the X electrodes and the Y electrodes respectively include:
intersection portions each formed where the X electrodes and the Y electrodes overlap each other; and
electrode portions each formed between the intersection portions, and
wherein the electrode portions of one of the X electrodes and the Y electrodes are smaller in area than the other thereof so that a capacitance of one line of the X electrodes and a capacitance of one line of the Y electrodes are equal to each other.

2. A display device with a touch panel according to claim 1, further comprising a dummy electrode placed close to one of the electrode portions that is smaller in area.

3. A display device with a touch panel according to claim 1, wherein either the X electrodes or the Y electrodes are made of a transparent conductive film.

4. A display device with a touch panel according to claim 1, wherein both of the X electrodes and the Y electrodes are made of transparent conductive films that sandwich an insulating film.

5. A display device with a touch panel according to claim 2, wherein both the X electrodes and the Y electrodes are made of transparent conductive films that sandwich an insulating film, and
wherein the dummy electrode is made of a transparent conductive film that is formed in a same layer as the electrode portions which is smaller in area.

6. A display device with a touch panel, comprising:
a display panel; and
a touch panel bonded onto the display panel,
wherein the display panel has longer sides and shorter sides,
wherein the touch panel includes:
X electrodes; and
Y electrodes which intersect the X electrodes,
wherein the X electrodes are formed along the longer sides whereas the Y electrodes are formed along the shorter sides,
wherein the X electrodes and the Y electrodes respectively include:
intersection portions each formed where the X electrodes and the Y electrodes overlap each other; and
individual electrodes each formed between the intersection portions and being wider than the intersection portions, and
wherein each of the individual electrodes of the X electrodes is smaller in area than each of the individual electrodes of the Y electrodes.

7. A display device with a touch panel according to claim 6, further comprising dummy electrodes which are formed close to the individual electrodes of the X electrodes.

8. A display device with a touch panel according to claim 6, wherein either the X electrodes or the Y electrodes are made of a transparent conductive film.

9. A display device with a touch panel according to claim 6, wherein both of the X electrodes and the Y electrodes are made of transparent conductive films that sandwich an insulating film.

10. A display device with a touch panel according to claim 7,
wherein both the X electrodes and the Y electrodes are made of transparent conductive films that sandwich an insulating film, and wherein the dummy electrodes is made of a transparent conductive film that is formed in a same layer as the X electrodes.

11. A display device with a touch panel, comprising:
a display panel; and
a touch panel placed on the display panel,
wherein the touch panel includes:
X electrodes; and
Y electrodes which intersect the X electrodes,
wherein the X electrodes and the Y electrodes respectively include:
intersection portions each formed where the X electrodes and the Y electrodes overlap each other; and
individual electrodes each formed between the intersection portions and being wider than the intersection portions,
wherein a number of the individual electrodes of the X electrodes is n and a number of the individual electrodes of the Y electrodes is m, and
wherein a ratio between an area of the individual electrodes of the X electrodes and an area of the individual electrodes of the Y electrodes is m:n.

12. A display device with a touch panel according to claim 11, further comprising dummy electrodes which are formed close to the individual electrodes of the X electrodes and are supplied a floating potential.

13. A display device with a touch panel according to claim 11, wherein either the X electrodes or the Y electrodes are made of a transparent conductive film.

14. A display device with a touch panel according to claim 11, wherein both of the X electrodes and the Y electrodes are made of transparent conductive films that sandwich an insulating film.

15. A display device with a touch panel according to claim 12,
wherein both the X electrodes and the Y electrodes are made of transparent conductive films that sandwich an insulating film, and
wherein the dummy electrodes each are made of a transparent conductive film that is formed in a same layer as the X electrodes.

* * * * *